(12) United States Patent
Hsu et al.

(10) Patent No.: US 8,725,208 B2
(45) Date of Patent: *May 13, 2014

(54) SERIAL TRANSMISSION INTERFACE BETWEEN AN IMAGE SENSOR AND A BASEBAND CIRCUIT

(75) Inventors: En-Feng Hsu, Hsin-Chu (TW); Han-Chang Lin, Hsin-Chu (TW); Chia-Yi Liu, Hsin-Chu (TW); Cho-Yi Lin, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 969 days.

This patent is subject to a terminal disclaimer.

(21) Appl. No.: 12/265,723

(22) Filed: Nov. 5, 2008

(65) Prior Publication Data

US 2010/0113093 A1 May 6, 2010

(51) Int. Cl.
*H04M 1/00* (2006.01)

(52) U.S. Cl.
USPC ............ 455/557; 455/556.1; 455/550.1

(58) Field of Classification Search
USPC ............ 382/312–313; 455/556.1–557, 550.1, 455/418–420, 41.2, 566
See application file for complete search history.

(56) References Cited

U.S. PATENT DOCUMENTS

| | | | | |
|---|---|---|---|---|
| 6,844,895 | B1 * | 1/2005 | Billerbeck et al. | 348/211.2 |
| 7,643,849 | B2 * | 1/2010 | Lu et al. | 455/556.1 |
| 7,657,227 | B2 * | 2/2010 | Doan et al. | 455/41.3 |
| 7,715,796 | B2 * | 5/2010 | Honda et al. | 455/41.2 |
| 7,917,173 | B2 * | 3/2011 | Lu et al. | 455/557 |
| 8,180,398 | B2 * | 5/2012 | Lu et al. | 455/557 |
| 2003/0107659 | A1 * | 6/2003 | Takahashi et al. | 348/222.1 |
| 2004/0119844 | A1 * | 6/2004 | Aldrich et al. | 348/231.99 |
| 2006/0104311 | A1 * | 5/2006 | Soga et al. | 370/503 |
| 2007/0287408 | A1 * | 12/2007 | Lu et al. | 455/403 |
| 2008/0292219 | A1 * | 11/2008 | Keall et al. | 382/313 |
| 2010/0111489 | A1 * | 5/2010 | Presler | 386/52 |
| 2011/0151927 | A1 * | 6/2011 | Lin et al. | 455/556.1 |

FOREIGN PATENT DOCUMENTS

| CN | 1738355 A | 2/2006 |
|---|---|---|
| CN | 101039417 A | 9/2007 |

* cited by examiner

*Primary Examiner* — Sharad Rampuria
(74) *Attorney, Agent, or Firm* — Winston Hsu; Scott Margo

(57) ABSTRACT

A serial transmission interface between an image sensor and a baseband circuit includes a transmission end and a reception end. The transmission end is set in the image sensor, and is utilized for transmitting image data sensed by the image sensor. The reception end is set in the baseband circuit, and is utilized for receiving the image data transmitted from the transmission end. The transmission end is one of a master control end and a slave control end, and the reception end is correspondingly the other.

17 Claims, 7 Drawing Sheets

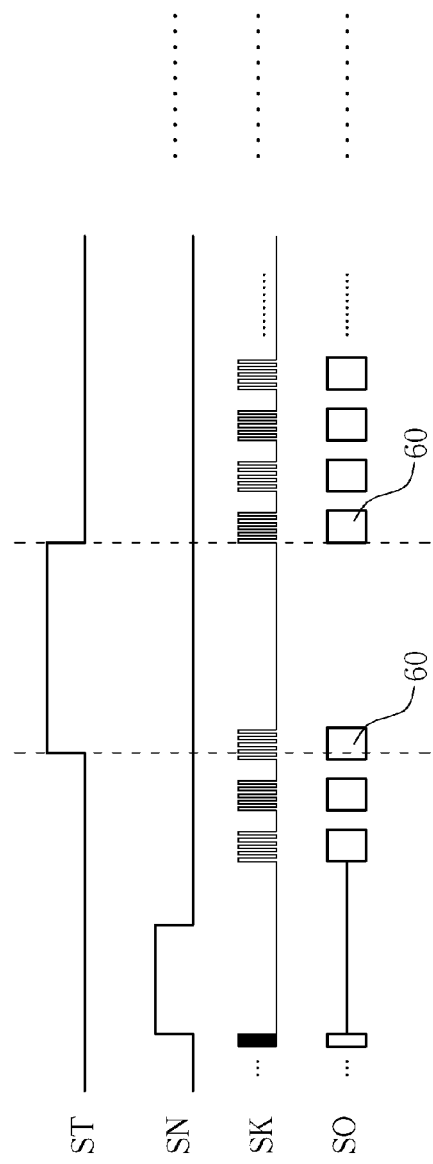

SERIAL TRANSMISSION INTERFACE BETWEEN AN IMAGE SENSOR AND A BASEBAND CIRCUIT

BACKGROUND OF THE INVENTION

1. Field of the Invention

The present invention relates to a serial transmission interface, and more particularly, to a serial transmission interface between an image sensor and a baseband circuit.

2. Description of the Prior Art

A cellular phone has become a necessity in human daily life, and has had more and more powerful functions. Generally, the cellular phone has a function of taking photos, and with advanced image processing technology, the photo quality provided by the cellular phone becomes better and better.

Please refer to FIG. 1, which is a schematic diagram of a data transmission method between an image sensor 10 and a baseband circuit 12 of a cellular phone in the prior art. The image sensor 10 is utilized for sensing image data and transforming the optical image data into the electronic image data, which is transmitted to a reception end 120 of the baseband circuit 12 via a transmission end 100. In the prior art, the data transmission method between the transmission end 100 and the reception end 120 is in parallel, and the transmission end 100 is generally a master control end while the reception end 120 is a slave control end.

Generally speaking, the data transmission method in parallel can increase the speed of data processing. However, the circuit areas thereof are too large and incapable of conforming to the requirements of small-sized products. Moreover, the transmission end 100 of the image sensor 10 is always fixed as the master control end without flexibility, and thus needed to be improved.

SUMMARY OF THE INVENTION

It is therefore a primary objective of the claimed invention to provide a serial transmission interface between an image sensor and a baseband circuit to overcome the drawbacks of the prior art.

The present invention discloses a serial transmission interface between an image sensor and a baseband circuit. The serial transmission interface comprises a transmission end and a reception end. The transmission end is set in the image sensor for transmitting image data sensed by the image sensor. The reception end is set in the baseband circuit for receiving the image data transmitted from the transmission end. The transmission end is one of a master control end and a slave control end, and the reception end is correspondingly the other.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 7 is a timing diagram of the frame synchronizing signal SN, the clock signal SK, the image data signal SO and the indicating signal ST.

DETAILED DESCRIPTION

Figure 1:
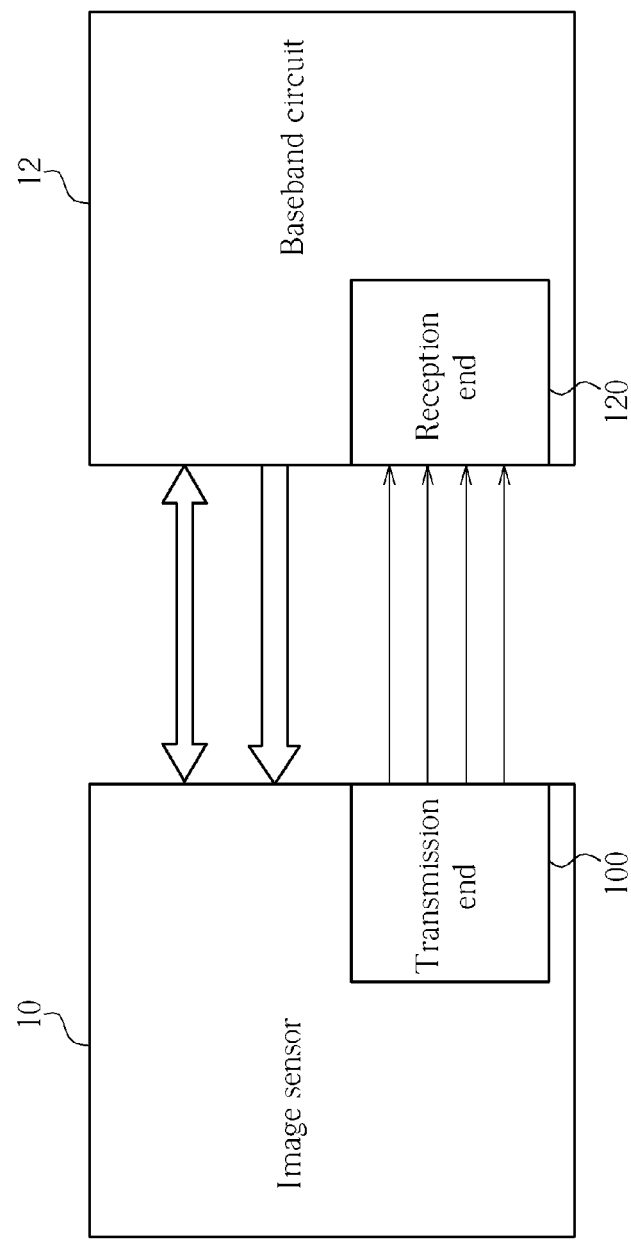
FIG. 1 is a schematic diagram of a data transmission method between an image sensor and a baseband circuit of a cellular phone in the prior art.
Figure 2:
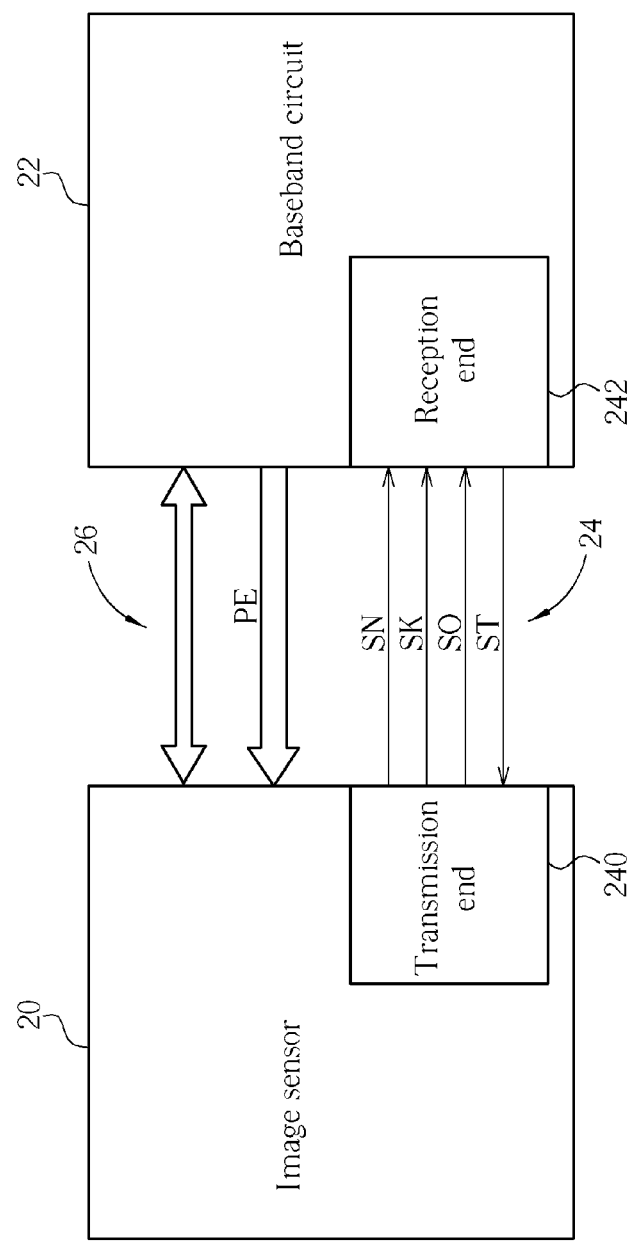
FIG. 2 is a schematic diagram of a serial transmission interface between an image sensor and a baseband circuit according to an embodiment of the present invention.

Please refer to FIG. 2, which is a schematic diagram of a serial transmission interface 24 between an image sensor 20 and a baseband circuit 22 according to an embodiment of the present invention. The serial transmission interface 24 of the present invention is applied in a hand-held electronic device with a function of taking photos, such as a cellular phone or a PDA. The serial transmission interface 24 is utilized for transmitting image data, and comprises a transmission end 240 and a reception end 242. The transmission end 240 is set in the image sensor 20 for transmitting image data sensed by the image sensor 20. The reception end 242 is set in the baseband circuit 22 for receiving the image data transmitted from the transmission end 240. Moreover, between the image sensor 20 and the baseband circuit 22, there is another serial transmission interface 26 of control signals, which is utilized for transmitting related control data and clock signals to bridge a connection of communication between the image sensor 20 and the baseband circuit 22. The serial transmission interface 26 of the control signals can be implemented with an Inter-IC Bus, which is familiar to those skilled in the art, and is omitted here. Besides, an interface PE is utilized for transmitting power signals and clock signals of the system, so as to control the image sensor 20.

Figure 3:
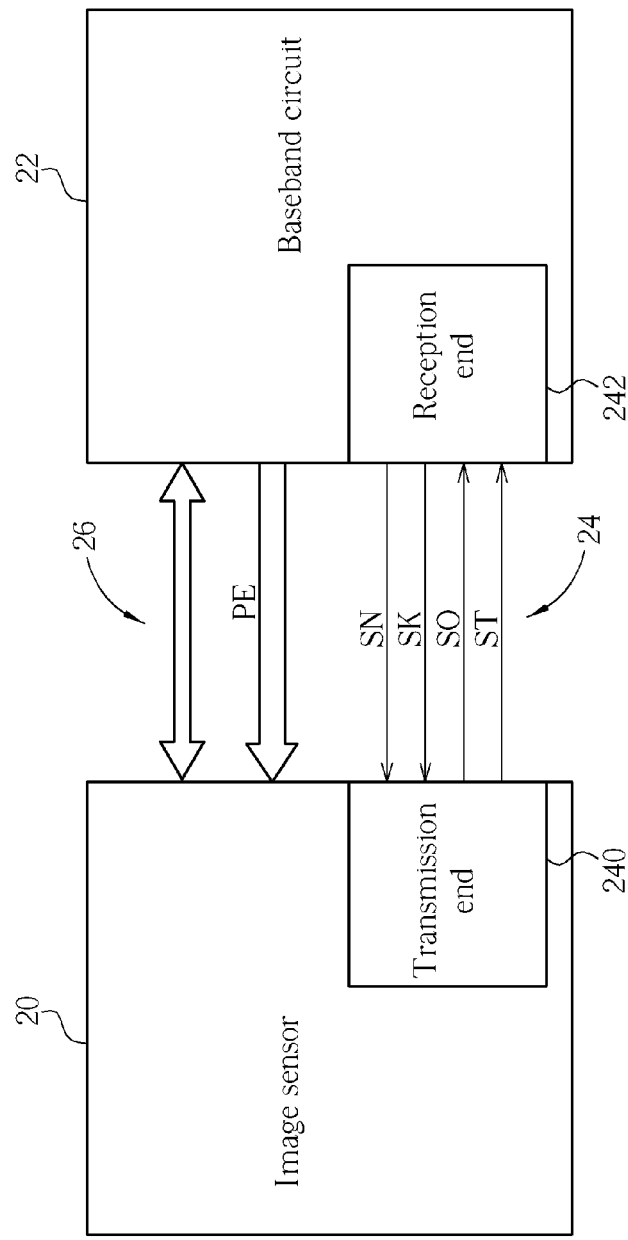
FIG. 3 is a schematic diagram of a serial transmission interface between an image sensor and a baseband circuit according to an embodiment of the present invention.

In FIG. 2, the transmission end 240 is a master control end, and the reception end 242 is correspondingly a slave control end. On the other hand, the transmission end 240 in the present invention can be configured as the slave control end, and the reception end 242 can be correspondingly configured as the master control end, as shown in FIG. 3. For explaining difference of the two conditions, a frame synchronizing signal SN, a clock signal SK, an image data signal SO and an indicating signal ST are taken as example. The frame synchronizing signal SN is utilized for controlling the transmission timing of the image data signal SO. The clock signal SK is utilized for synchronizing working frequencies of the transmission end 240 and the reception end 242. The image data signal SO is the image data transmitted from the transmission end 240 to the reception end 242. The indicating signal ST is utilized for stopping the transmission end 240 from transmitting the image data.

Please refer to FIG. 2. When the transmission end 240 is the master control end, the frame synchronizing signal SN and the clock signal SK are transmitted from the transmission end 240 to the reception end 242, and the indicating signal ST is transmitted from the reception end 242 to the transmission end 240. On the other hand, please refer to FIG. 3, when the transmission end 240 is the slave control end, the frame synchronizing signal SN and the clock signal SK are transmitted from the reception end 242 to the transmission end 240, and the indicating signal ST is transmitted from the transmission end 240 to the reception end 242. In other words, the transmission end 240 in the present invention can be one of the master control end and the slave control end, and the reception end 242 is correspondingly the other, which can enhance diversity and flexibility in applications of the present invention. Moreover, in FIG. 2 and FIG. 3, the transmission direction of the image data signal SO is unchanged, which is transmitted from the transmission end 240 to the reception end 242.

Figure 4:
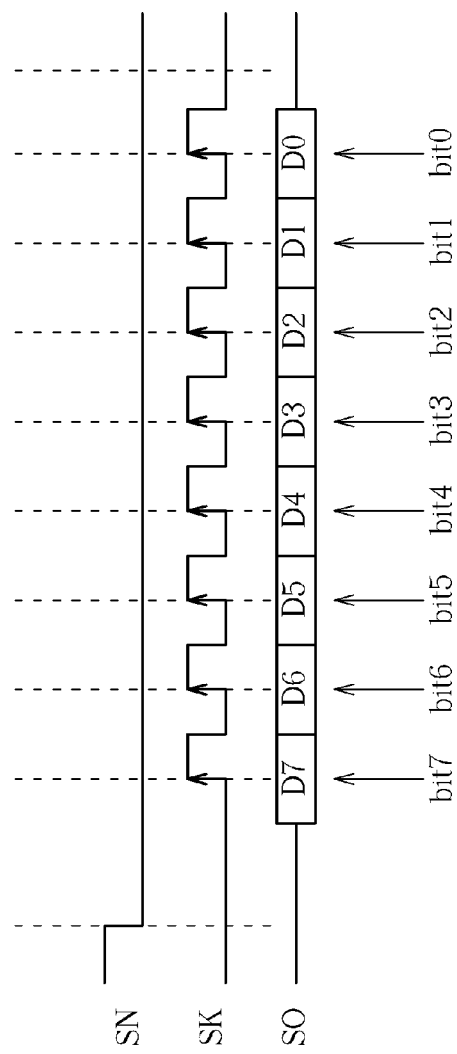
FIG. 4 is a timing diagram of the frame synchronizing signal SN, the clock signal SK and the image data signal SO according to an embodiment of the present invention.

Please refer to FIG. 4, which is a timing diagram of the frame synchronizing signal SN, the clock signal SK and the image data signal SO according to an embodiment of the present invention. In FIG. 4, the image data signal SO transmits image data with 8-bit-words code, which is shown as D7, D6, D5, D4, D3, D2, D1 and D0, that is, bit7, bit6, bit5, bit4, bit3, bit2, bit1 and bit0. Moreover, the image data signal SO transmits image data in the condition when the clock signal SK is high.

Figure 5:
FIG. 5 is a timing diagram of the frame synchronizing signal SN, the clock signal SK and the image data signal SO in more detail.

Please refer to FIG. 5, which is a timing diagram of the frame synchronizing signal SN, the clock signal SK and the image data signal SO in more detail. As shown in FIG. 5, each word of the image data signal SO corresponds to each high sector of the clock signal SK. Since frequency of the clock signal SK is adjustable, a data size of each word of the image data signal SO can be adjusted correspondingly. In other words, when the transmission end 240 is the master control end, the transmission end 240 is further utilized for adjusting the size of the image data transmitted by the transmission end 240. When the reception end 242 is the master control end, the reception end 242 is further utilized for controlling the transmission end 240 to adjust the size of the image data transmitted by the transmission end 240.

Figure 6:
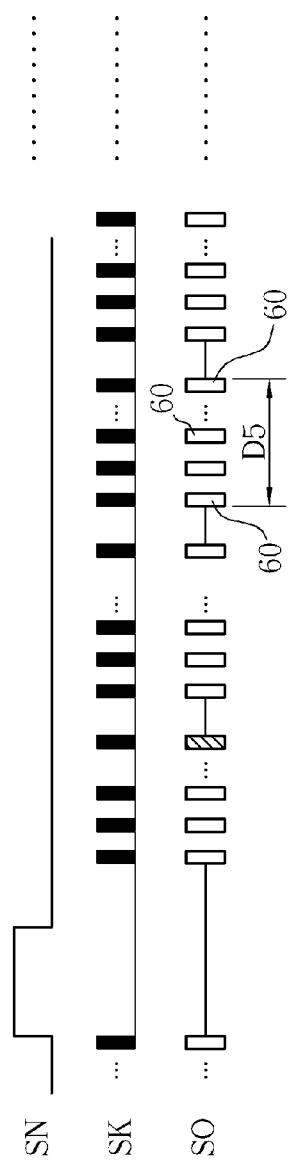
FIG. 6 is a timing diagram of the frame synchronizing signal SN, the clock signal SK and the image data signal SO in more detail.

Please refer to FIG. 6, which is a timing diagram of the frame synchronizing signal SN, the clock signal SK and the image data signal SO in more detail. In FIG. 6, the transmission end 240 slices each code of the image data, e.g. D5, into a plurality of data groups 60 with a specified size for each of the data groups 60. The plurality of data groups 60 are transmitted in order and with a default time interval between each other. Preferably, a size of each data group 60 is 32 word, but is not limited to 32 word, for those skilled in the art can make alternations and modifications accordingly. The reason for slicing each code of the image data into a plurality of data groups 60 is that a data size of registers of the baseband circuit 22 may be too small. Therefore, as each code of the image data is sliced into a plurality of data groups 60 with smaller size, the image data can be transmitted between the image sensor 20 and the baseband circuit 22 easily without errors introduced.

Please refer to FIG. 7, which is a timing diagram of the frame synchronizing signal SN, the clock signal SK, the image data signal SO and the indicating signal ST. The indicating signal ST is utilized for stopping the transmission end 240 from transmitting the image data temporarily. As shown in FIG. 7, when the indicating signal ST is high, the clock signal SK and the image data signal SO are both stopped from transmitting signals. Therefore, when the baseband circuit 22 is too busy to process image data, the baseband circuit 22 can transmit the indicating signal ST via the reception end 242 to the transmission end 240, so as to stop the transmission end 240 from transmitting the image data.

Please note that, the serial transmission interface 24 of the present invention is preferably a Serial Peripheral Interface, SPI, but a Universal Asynchronous Receiver/Transmitter, UART and an Inter-IC Bus, I2C can be included in the scope of the present invention as well.

In conclusion, the serial transmission interface of the present invention transmits image data in serial, so as to reduce the loading of processing image data by the baseband circuit. Moreover, the transmission end can be one of the master control end and the slave control end, which can enhance diversity and flexibility in applications. In addition, a size of the image data transmitted can be adjusted by slicing each code of the image data into a plurality of data groups, so as to match different baseband circuits. Finally, the pin number needed in serial transmission is less than that in parallel transmission, and thus the cost of production can be reduced.

Those skilled in the art will readily observe that numerous modifications and alterations of the device and method may be made while retaining the teachings of the invention.

What is claimed is:

1. A serial transmission interface between an image sensor and a baseband circuit comprising:
   a transmission end set in the image sensor for transmitting image data sensed by the image sensor; and
   a reception end set in the baseband circuit for receiving the image data transmitted from the transmission end;
   wherein the transmission end transmits the image data to the reception end in serial, the transmission end is one of a master control end and a slave control end, and the reception end is correspondingly the other;
   wherein the image data is transmitted only when a clock signal is high.

2. The serial transmission interface of claim 1 applied in a hand-held electronic device with a function of taking photos.

3. The serial transmission interface of claim 2, wherein the hand-held electronic device is a cellular phone.

4. The serial transmission interface of claim 1, wherein when the transmission end is the master control end, the transmission end is further utilized for adjusting a size of the image data transmitted by the transmission end.

5. The serial transmission interface of claim 1, wherein when the reception end is the master control end, the reception end is further utilized for controlling the transmission end to adjust a size of the image data transmitted by the transmission end.

6. The serial transmission interface of claim 1, wherein the reception end is further utilized for transmitting an indicating signal to the transmission end, so as to stop the transmission end from transmitting the image data.

7. The serial transmission interface of claim 1, wherein the transmission end is further utilized for slicing the image data into a plurality of data groups with a specified size for each of the data groups.

8. The serial transmission interface of claim 7, wherein the plurality of data groups are transmitted in order and with a default time interval between each other.

9. The serial transmission interface of claim 1 being a Serial Peripheral Interface, SPI.

10. The serial transmission interface of claim 1 being a Universal Asynchronous Receiver/Transmitter, UART.

11. The serial transmission interface of claim 1 being an Inter-IC Bus, I2C.

12. The serial transmission interface of claim 1, wherein there is another serial transmission interface for transmitting a control signal between the image sensor and the baseband circuit.

13. The serial transmission interface of claim 1, wherein the image data is transmitted with an 8-bit-words code when the clock signal is high.

14. The serial transmission interface of claim 13, wherein a data size of a word of the image data is adjusted according to a frequency of the clock signal.

15. The serial transmission interface of claim 13, wherein the transmission end slices a code of the image data into a plurality of data groups, and the plurality of data groups are transmitted in order and with a default time interval between each other.

16. The serial transmission interface of claim 1, wherein a clock signal and the image data are stopped from transmission when an indicating signal is high.

17. The serial transmission interface of claim 1, wherein the transmission end slices the each code of the image data into a plurality of data group with a specified size of each of the data group.

* * * * *